United States Patent
Dec et al.

(10) Patent No.: US 9,900,209 B2
(45) Date of Patent: Feb. 20, 2018

(54) TECHNIQUES FOR YANG MODEL VERSION CONTROL VALIDATION

(71) Applicant: Cisco Technology, Inc., San Jose, CA (US)

(72) Inventors: Wojciech Dec, Amsterdam (NL); Jan Medved, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 228 days.

(21) Appl. No.: 14/853,877

(22) Filed: Sep. 14, 2015

(65) Prior Publication Data

US 2017/0078158 A1     Mar. 16, 2017

(51) Int. Cl.
*G06F 15/16* (2006.01)
*H04L 12/24* (2006.01)
*G06F 11/30* (2006.01)

(52) U.S. Cl.
CPC .............. *H04L 41/08* (2013.01); *G06F 11/30* (2013.01); *H04L 41/0869* (2013.01)

(58) Field of Classification Search
CPC .......................... H04L 41/082; H04L 41/0869
(Continued)

(56) References Cited

U.S. PATENT DOCUMENTS 5,724,510 A     3/1998 Arndt et al.
6,061,350 A     5/2000 Min
(Continued)

FOREIGN PATENT DOCUMENTS

WO     WO 2006/020466 A2     2/2006

OTHER PUBLICATIONS

Moberg, Carl, "Understanding NETCONF and YANG," published Jan. 28, 2014 in United States by Network World, downloaded Apr. 11, 2016, 4 pages.

*Primary Examiner* — Hamza Algibhah
(74) *Attorney, Agent, or Firm* — Hickman Palermo Becker Bingham LLP

(57) ABSTRACT

In one embodiment, a method is provided for using a server computer, creating and storing a first module name, a first indication of a first version, and a first signature for a first data model that is digitally stored in a digital electronic data storage unit; receiving a second data model from the data storage unit and identifying a second module name in the second data model; comparing the second module name of the second data model to the first module name of the first data model; determining that the first module name and the second module name comprise a same name, and in response thereto, identifying a second indication of a second version from a revision field of the second data model; using the server computer, comparing the second indication of the second version from the second data model to the first indication of the first version of the first data model; determining the first indication and the second indication indicate the same version, determining a second signature for the second data model; comparing the second signature for the second data model with the first signature for the first data model; determining from the comparison that the second signature and the first signature are different, and in response thereto, creating and storing a flag value in main memory of the server computer and specifying that the second data model is different.

18 Claims, 11 Drawing Sheets

(58) Field of Classification Search
USPC .......................................................... 709/220
See application file for complete search history.

(56) References Cited

U.S. PATENT DOCUMENTS

| | | | |
|---|---|---|---|
| 6,738,932 B1* | 5/2004 | Price | G06F 11/079 |
| | | | 714/38.11 |
| 7,356,679 B1* | 4/2008 | Le | G06F 17/30067 |
| | | | 707/E17.01 |
| 7,698,561 B2 | 4/2010 | Nagendra et al. | |
| 9,086,942 B2* | 7/2015 | Gocek | G06F 8/70 |
| 9,628,407 B2* | 4/2017 | Guntaka | H04L 49/10 |
| 2012/0266022 A1* | 10/2012 | Kydles | G06F 11/0796 |
| | | | 714/32 |
| 2013/0275943 A1* | 10/2013 | Namjoshi | G06F 8/75 |
| | | | 717/122 |
| 2014/0032915 A1* | 1/2014 | Muzammil | H04L 9/3236 |
| | | | 713/176 |
| 2014/0157251 A1* | 6/2014 | Hocker | G06F 8/71 |
| | | | 717/170 |
| 2014/0245268 A1* | 8/2014 | Golender | G06F 11/3636 |
| | | | 717/128 |
| 2016/0062746 A1* | 3/2016 | Chiosi | G06F 8/35 |
| | | | 717/104 |
| 2016/0191316 A1* | 6/2016 | Guntaka | H04L 49/15 |
| | | | 370/254 |

* cited by examiner

FIG.5

Module ipsec-service

| Node | Node-Type | Type-def | Description | Warning |
|---|---|---|---|---|
| ipsec | container | - | A simple IPSec service | |
| node-list | list | | | |
| node-name | leaf | string | Name of hub router | |
| node-ip | leaf | inet:ipv4-address; | Hub IP address | |
| peer-node | list | | | |
| peer-name | leaf | string | Name of spoke router | Descrip Added |
| node-subnets | list | | IP and mask behind route | |
| ip | leaf | inet:ipv6-address; | | Type-def Change |
| inv-mask | leaf | inet:ipv6-address; | | Type-def Change |
| shared-key | list | | | |
| shared-key | leaf | string | | |
| peer-address | leaf | inet:ip-address; | | |
| encryption-prot | list | | | |
| set-name | leaf | string | | |

TECHNIQUES FOR YANG MODEL VERSION CONTROL VALIDATION

FIELD OF THE DISCLOSURE

The present disclosure relates to data modeling in the field of internetworking device management, and more specifically, to an improved computer implemented method for Yang data model version control in network management.

BACKGROUND

YANG or "Yang" is a data modeling language for the NETCONF network configuration protocol and is described in Request for Comments (RFC) 6020 of the Internet Society, published in October 2010. The data modeling language can be used to model both configuration data as well as state data of network elements. Furthermore, Yang can be used to define the format of event notifications emitted by network elements and it allows data modelers to define the signature of remote procedure calls that can be invoked on network elements via the NETCONF protocol. Yang represents data structures in a hierarchical nested format. The language comes with a number of built-in data types, and other application-specific data types can be derived from the built-in data types. More complex reusable data structures can be represented as groupings. Yang data models can use XPATH expressions to define constraints on the elements of a data model. Thus, a Yang data model is a specialized data model for network devices. "Model," in this context, refers to digitally stored instructions and data that represent network device attributes, configuration and other metadata. To update a Yang model, the creator of the model increments a revision date by editing the date in which the model was created in the model file. When a network management device recognizes that the revision field of a Yang model for a particular device has changed, the management device regenerates any code necessary to meet the constraints and type definitions of the newest Yang model. This may involve re-writing a middleware layer for the management device that converts management commands from an overarching management application into network device specific configuration calls and remote procedure calls (RPCs), so they comply with the constraints of the new model. Unfortunately, this process results in significant data processing overhead.

In an effort to prevent the overhead of this updating process, some manufacturers attempt to update portions of the Yang data model without updating the revision data. In some cases, the client code does not need to change, but in other cases, changing the model leads to breakages between the management application and the network device being managed. This bad versioning practice as well as more malicious changes made to an updated Yang data model are difficult to isolate and troubleshoot under the current standards.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 5 is a block diagram illustrating a visualization of a second version a Yang model that has been compared with the first version of the Yang model.

DETAILED DESCRIPTION

Figure 1:
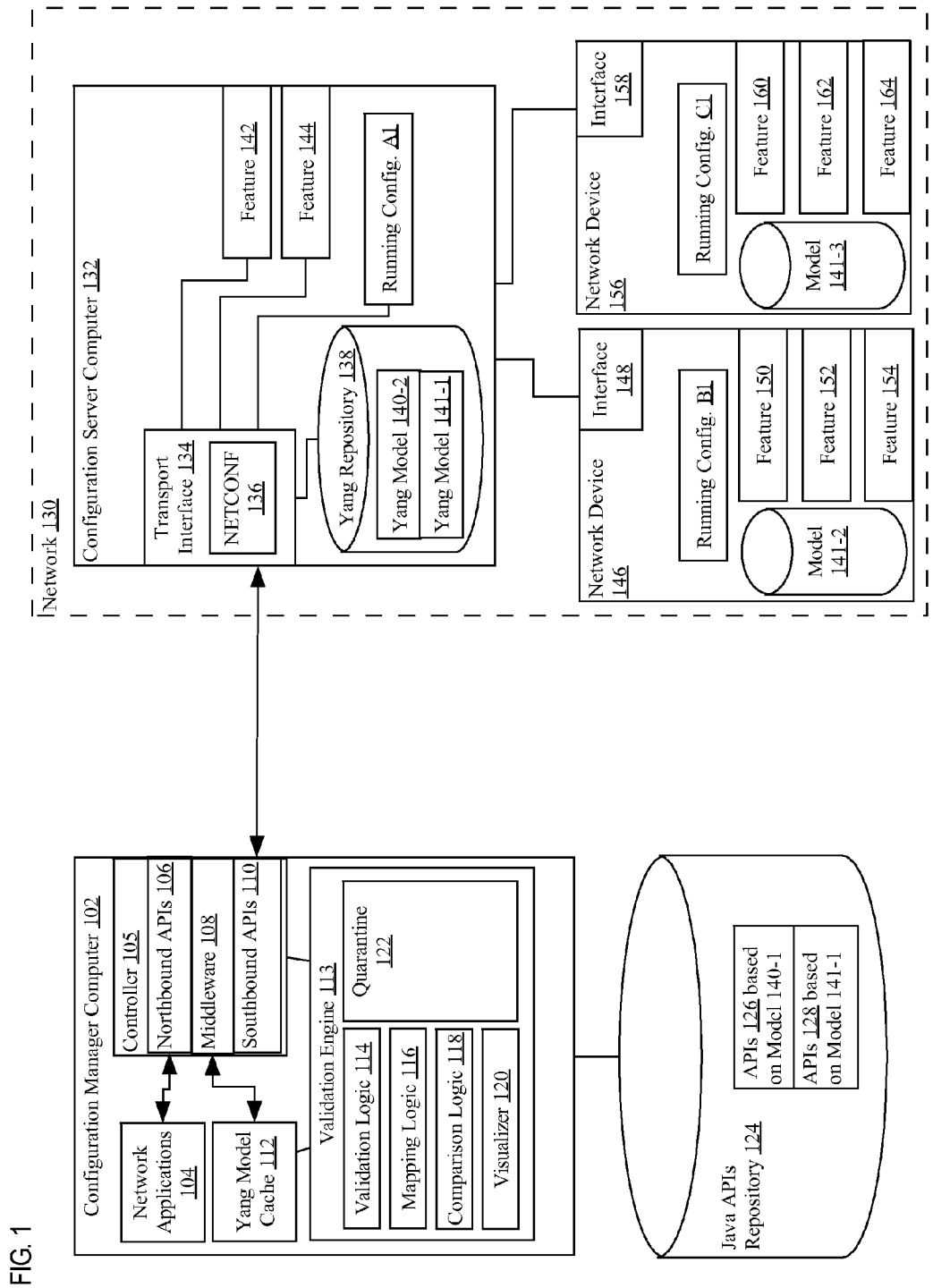
FIG. 1 is a block diagram illustrating a system blueprint of a network being remotely managed.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are described herein for validating a data model of a particular network device against a previously cached data model prior to using code generated by the cached data model to remotely manage the particular network device. The techniques include a network management computer receiving a set of one or more Yang models for one or more network devices. The Yang models are compiled and used to generate code that converts data from a high-level programing language APIs or RESTful interfaces to low-level network configuration data or remote procedure calls (RPCs), implemented through a protocol such as NETCONF. The techniques can be implemented in a programmed computer having executable instructions that are programmed to perform the functions that are described further herein.

The network management computer normalizes each given Yang model and caches these Yang models in a Yang model cache. The network management computer then determines a signature for each particular cached Yang model by applying a hash algorithm to each normalized model. When a network manager uses the network management client to access or configure a particular network device, the Yang model that is currently governing the running network device is sent to the network management computer. Prior to executing code generated from the corresponding cached Yang model, the network management computer compares the signature of the Yang model that is currently governing the network device against the cached model's basis signature. Any data model with the same module name and revision date, but a different hash signature may be flagged and quarantined for review by additional testing processes.

Additionally, techniques are described herein for tracking and visualizing the differences between the quarantined data model and the basis data model. An automated "difference impact" processing and visualization mechanism parses the values from each field in the basis model and the incoming model. The network management computer generates a graphical user interface containing difference indications in the models. Based on the difference indications, a network administrator may choose to use a basis model instead of a quarantined data model, a quarantined model instead of a basis model, or an updated version of the quarantined model for a particular network device.

Herein described are a method, apparatus, and non-transitory computer readable media for using a server computer, creating and storing a first module name, a first indication of a first version, and a first signature for a first data model that is digitally stored in a digital electronic data storage unit; using the server computer, receiving a second data model from the data storage unit and identifying a second module name in the second data model; using the server computer, comparing the second module name of the second data model to the first module name of the first data model; determining that the first module name and the second module name comprise a same name, and in response thereto, identifying a second indication of a second version from a revision field of the second data model; using the server computer, comparing the second indication of the second version from the second data model to the first indication of the first version of the first data model; determining the first indication and the second indication indicate the same version, determining a second signature for the second data model; using the server computer, comparing the second signature for the second data model with the first signature for the first data model; determining from the comparison that the second signature and the first signature are different, and in response thereto, creating and storing a flag value in main memory of the server computer and specifying that the second data model is different.

Overview of Example Embodiments

FIG. 1 is a block diagram that depicts a network and programmed logic elements according to one embodiment. In the embodiment illustrated in FIG. 1, a network 130 is coupled to a configuration server computer 132, network device 146, and network device 156, which are programmatically configurable by the configuration manager computer 102. The configuration server computer 132 is directly configurable by the configuration manager computer 102, and network devices 146, 156 may be indirectly configured by the configuration manager computer 102. A network device may be any type of network device or network element including but not limited to virtual and physical devices. Examples typically include, but are not limited to, network infrastructure elements such as gateways, routers, bridges, switches, hubs, spokes, and repeaters.

The configuration server computer 132, remote network device 146, and remote network device 156 each have configurable features 142, 144, 150, 152, 154, 160, 162, 164. These features may include hardware components or software components. Remotely accessible features generally comprise a configuration, a state, a notification, or a remote procedure call (RPC). For example, a feature may comprise a configurable IP address, or the state of a sensor that measures the local CPU temperature of a network device. Each feature is directly or indirectly accessible through a transport interface 134, 148, 158. The transport interfaces may include a variety of protocols for transferring data among network devices. The protocols may include but are not limited to: NETCONF, OpenFlow, OVSDB, LISP, BGP, PCEP, or SNMP.

In a preferred embodiment, the interface protocol includes at least NETCONF 136 for each interface 110, 134, 148, 158. The NETCONF protocol has network specific configuration operations such as making individual configuration updates to each device in a network and committing the configuration changes for that network in an atomic action. These commands are written in a descriptive XML format, so a network administrator can easily decipher the function of each command and notification.

Certain elements of FIG. 1, such as NETCONF 136, and in the other drawing figures, may be shown in block form and described in terms of operational functions. Each such element may comprise, in one embodiment, one or more pages or other regions of main memory in a computer into which executable instructions have been loaded and which, when executed using one or more processors, cause the computer to perform the functions that are described herein for the corresponding element. Thus, each such block form element represents the practical application of the described function to a computer in terms of executable instructions or other logic.

Remote Network Management

In an embodiment, network 130 is remotely managed, monitored, and accessed by one or more network applications 104 such as network security management applications and data flow management applications. These applications 104 are often written in a high level programming language such as JAVA or C and interface with network devices through a standardized Java API or REST API, which are referred to herein as northbound APIs 106. The configuration manager computer 102 comprises middleware 108 that has a variety of protocol plugins for interfacing with the lower level features of remote network devices. These lower-level protocols are referred to herein as southbound APIs 110. The middleware 108 comprises a service abstraction layer (SAL) that converts information between the northbound APIs 106 and the southbound APIs 110.

The service abstraction layer may be API-driven (AD-SAL), data model driven (AD-SAL), or a combination of both. In AD-SAL, a common set of services are exposed through the Northbound APIs, and implemented by some or all of the protocol plugins supported by the middleware 108. The network applications 104 may only access the network devices (i.e. configuration server computer 132, remote network device 146, and remote network device 156) through commands that are exposed by this common set of services. The common set of services may include, but are not limited to, a topology manager, a stats manager, a switch manager, a forwarding rules manager (FRM), a host tracker, and an address resolution protocol (ARP) handler.

In MD-SAL, the services that are exposed through the northbound APIs are derived from data models, for example Yang models, that provide a "schema" of the features and capabilities of each network device. The Internet Engineering Task Force (IETF) has created a standard, whereby every network device maintains in main memory a data model repository 138 of remotely accessible features of the given device and the datatypes required to access and configure those features. The primary form of data models stored in the data model repository includes files or "modules" stored in the Yang data modeling language.

The Yang data modeling language is used to enforce strict datatypes in data transferred to and from a remote network device. A Yang model is typically stored on a remote network device, and may be called via a protocol such as the NETCONF protocol. The NETCONF protocol transmits data via XML statements or files in order to perform configuration operations against network devices that have been Yang modeled.

The Yang data modeling language models four types of features for a network device: configurations, state, notifications, and remote procedure calls (RPC). In the Yang modeling language, the lowest level definitions are modeled in leaf nodes referred to simply as "leafs." Groups of capabilities may be organized into intermediate nodes referred to as "containers", which may be respectively organized into parent containers. Each node in a hierarchy supports a name and comment or description feature. Thus, a network administrator may review a given Yang model for a particular network device, and develop code for managing that device without referring to a reference manual.

Mounting Yang Models

Deriving a network configuration file for each network device by reviewing the Yang model for each network device and then manually creating a configuration file is an arduous task. A controller 105 (collectively, the northbound APIs 106, middleware 108, and southbound APIs 110) such as the Opendaylight controller may be configured to connect to each network device and request the Yang models stored in those network devices. The controller 105 then compiles the Yang models for each particular network device, and stores them as Yang models in a Yang model cache 112. The Yang models in the Yang model cache 112 may be used to generate code that communicates between different northbound and southbound APIs. A particular set of plugins for northbound APIs 126, 128 may be stored in an external repository such as Java APIs repository 124.

When an application or network administrator wishes to configure a particular network device, the controller 105 mounts the particular set of APIs from the repository 124. The controller 105 may then accept commands from a particular network application of network applications 104 and translate the data from the northbound API into code or configuration files that may be processed by remote network devices such as configuration server computer 132, network device 146, and network device 156.

Network applications 104 running on the controller 105 cause the controller 105 to connect to a remote network device via a particular protocol, such as NETCONF. In order to successfully configure or access the features of a remote network device, the Java API must be current with the Yang model that currently governs the remote network device. The Yang model version used to generate the Java API and the Yang model version that currently governs the device must then match at run-time for the scheme to work.

Normalization of Yang Models Prior to Generating a Signature

A data model may be normalized for storing and searching in a cache or database. Normalization may involve removing comments and whitespace from the overlying Yang model. Normalization may further include transforming the case attributes of all words to a single case attribute such as either lower case or upper case; compiling multiple modules into a single module; adding, removing or converting diacritical marks or specialized symbols, words, or code from each file to a more conventional or searchable format; transforming all spacing characters (returns, multiple spaces, enters) into a single type of character (i.e. single space), tokenizing common words, symbols, or code snippets in the Yang model against a dictionary, or further testing the Yang model for compilation errors before generating a signature.

Generating Basis Model Signatures

A validation engine 113 applies a hash function to a basis model in the cache 112 to create an independent and reproducible signature. In one embodiment, this signature is created after initially loading the Yang model for the first time. In another embodiment, this signature is created at compile time. In some embodiments, the signature may be based off of one model or the integration of multiple modules and submodules into a complete model.

When an application or network administrator wishes to configure a particular network device, the controller 105 mounts the Java API plugin 126 for the Yang model that models that particular network device. The controller 105 uses a southbound API 110 such as the NETCONF plugin to call the currently governing model on the network device and compare the signature of the basis model in the cache against the signature of a model on the network device before configuration data or RPC data is sent to the configuration server computer 132.

Yang Model Validation

When a particular data model is mounted by the controller 105, the controller 105 verifies that the model used to generate the API is the same as the model that currently defines the capabilities of the particular network device. The validation mechanism in place for Yang modeled devices includes comparing the module name of the mounted Yang model with the module name of the network device being configured. Then, the controller 105 compares the revision date of the mounted Yang model with the revision date of the network device being configured. These comparisons may involve sending a quick request for the Yang model that is currently running on the network device at connection time, and receiving an incoming Yang model that defines that data model. If the "revision date" of a particular model is not the same as the model used to generate the API or plugin, then the API or plugin needs to be regenerated.

In practice model developers often make minor adjustments to a data model without revising the version so as not disrupt the model users. In some cases, these adjustments lead to hidden breaks between an application of network applications 104 written in the high-level programming language and the execution of the RPC functions or configurations sent to the network device 132, 146, or 156. Because the controller 105 is configured to automatically generate code based on new Yang models, a model developer could even intentionally write a Yang model that breaks a network management application and pollutes the Yang model cache 112 in the configuration manager computer 102.

Example of Mis-Matched Yang Models

Figure 2A:
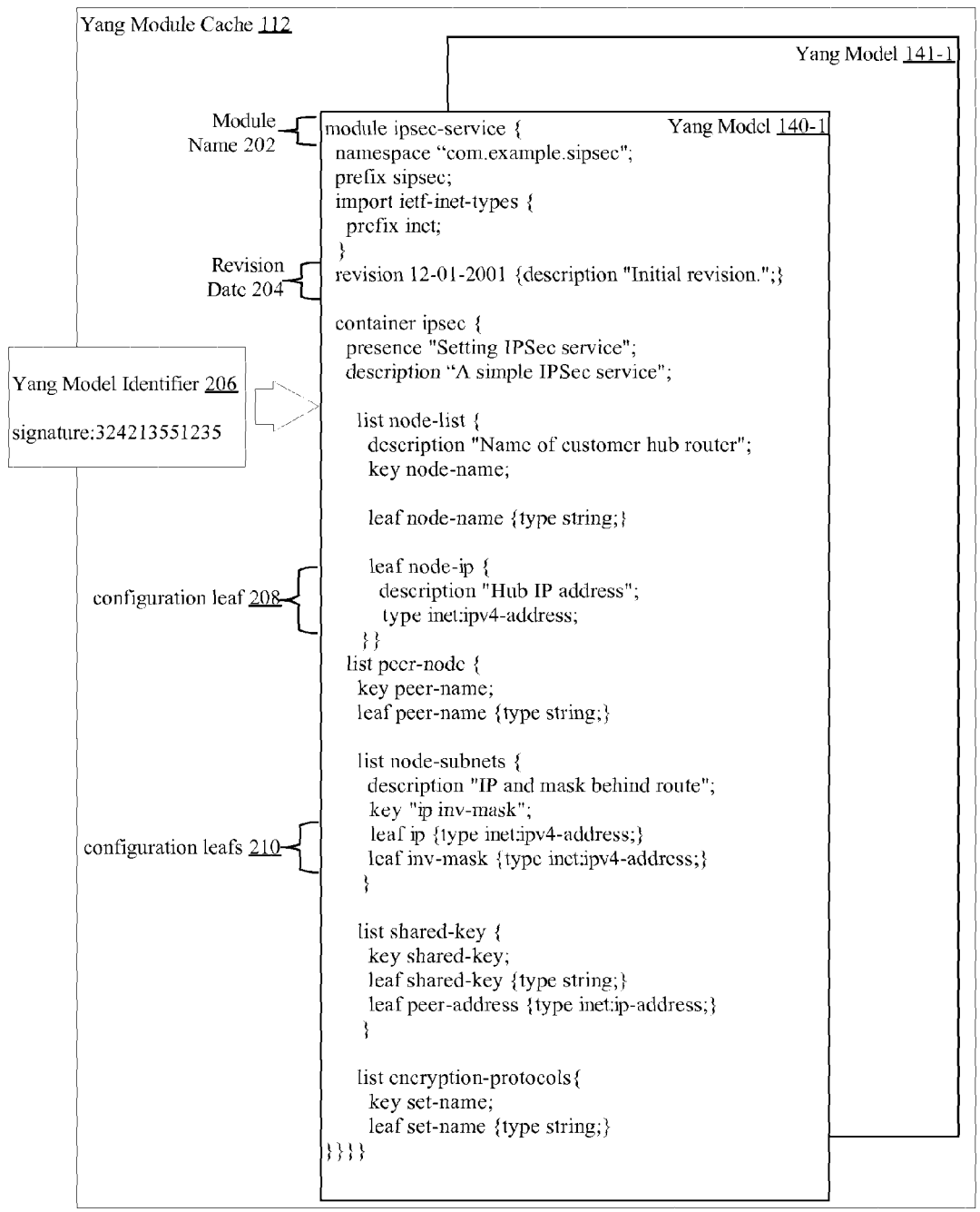
FIG. 2A is a block diagram illustrating a first version of a Yang data model in a Yang model cache on a configuration manager computer.

FIG. 2A is a block diagram illustrating a first version of a Yang model in a Yang model cache. In an embodiment, a Yang model cache 112 stores a Yang model 140-1 with an identifier that includes the module name 202, revision date, and a hash signature 206. For example, in FIG. 2A the module name 202 is ipsec-service, the revision date 204 is Dec. 2, 2001, and the hash-signature 206 is 324213551235. Alternatively, the identifier may only include the signature 206. Prior to remotely updating a current configuration A1, the configuration manager computer 102 is configured to connect to the configuration server computer 132 and validate that identifier is equivalent to an identifier for the Yang model 140-2 in Yang repository 138 that currently models the features of the configuration server computer 132. If the network application is attempting to update the configurations A1, B1, C1 of an entire network 130, as in the current example, then the configuration manager computer 102 may also request identifiers for the additional Yang models 141-2, 141-3 that currently govern the additional network devices 146, 156 within the network 130. These Yang models 141-2, 141-3 may be located in repository 138 or they may reside within the individual network devices 146, 156.

Figure 2B:
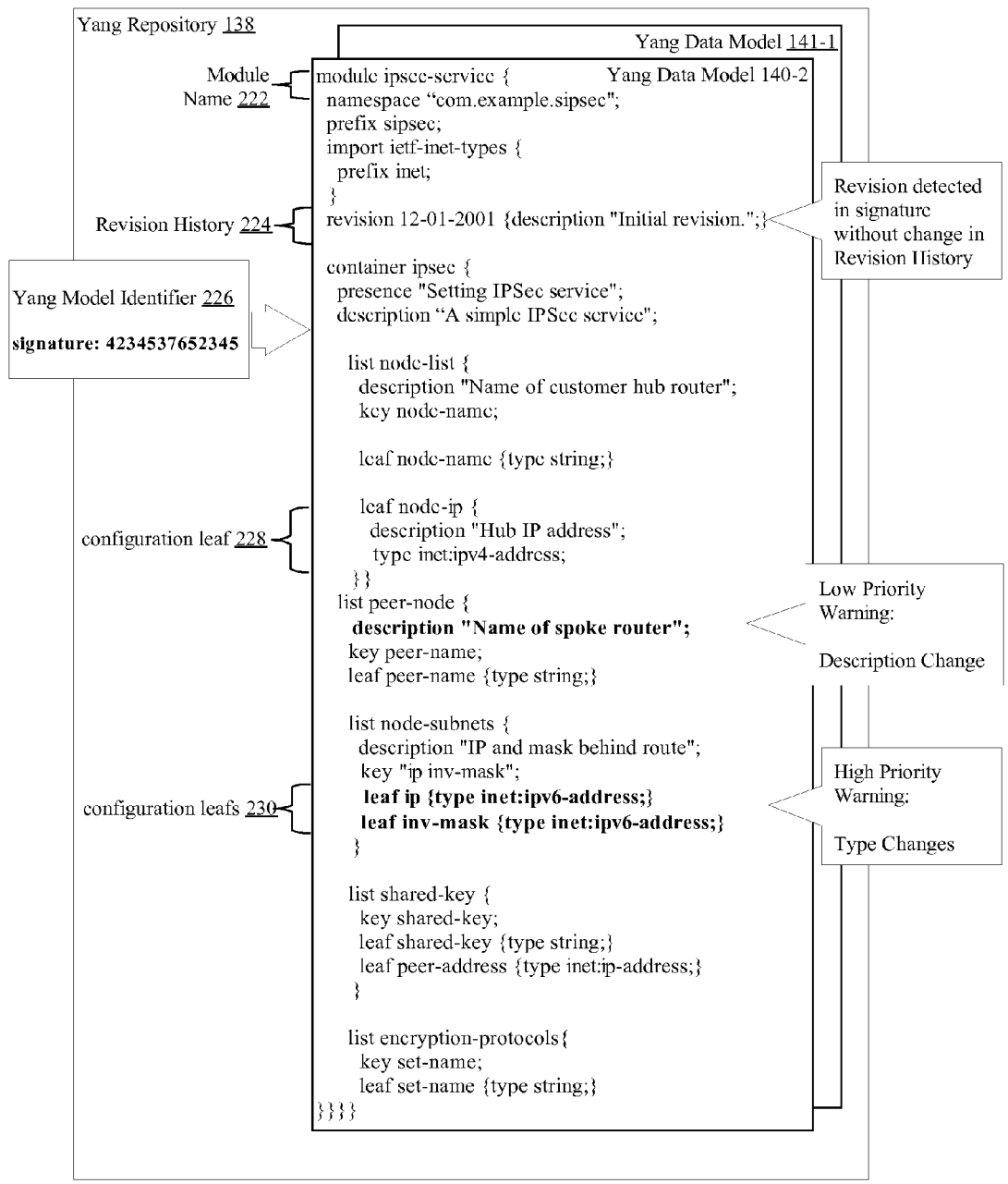
FIG. 2B is a block diagram illustrating a second version a Yang data model in a Yang model repository on a configuration server computer.

FIG. 2B is a block diagram illustrating a second version a Yang model 140-2 that is mismatched with the first version of the Yang model 140-1. The Yang repository 138 stores a Yang model 140-2 with an identifier that includes the module name 222: ipsec-service, revision date 224: Dec. 2, 2001, and a hash-signature 226: 4234537652345. The module names 202, 222 and revision dates 204, 224 in the Yang models depicted in FIGS. 2A and 2B are the same, but the signatures 206, 226 are different. The difference is a result of differences between leaves 208, 228, and 210, 230. Prior to accepting configuration data, the configuration server computer 132 is configured to send one or more identifiers that validates the basis Yang model 140-1 against the Yang model 140-2 that currently models the features of the configuration server computer 132. If the network application 104 is attempting to update the configurations A1, B1, C1 of an entire network 130, as in the current example, then the configuration server computer 132 may also send identifiers for the additional Yang models 141-1 that currently govern the additional network devices 146, 156 within the network 130.

Receiving a Current Model Signature Prior to Loading the Model

An optional extension to the NETCONF protocol includes having the network device compute the hash signature of the current governing model prior to sending the entire data model. In this extension, the network device and the validation engine 113 have the same hash algorithm, such as MD5 or FNV, loaded into each system. Then, the configuration server computer 132 communicates the hash-signature 226 for the model 140-2 prior to communicating the model 140-2 itself. Thus, the validation engine 113 may compare the computed basis signatures including signature 206 against the incoming signature 226 each time there is an attempt to load the model from a remote network device. If the incoming signature 226 matches the signature of an already stored model, then the controller 105 skips the following procedure to load the entire model 140-2. This NETCONF extension speeds-up mounted model processing when loading from a remote network device.

Figure 3A:
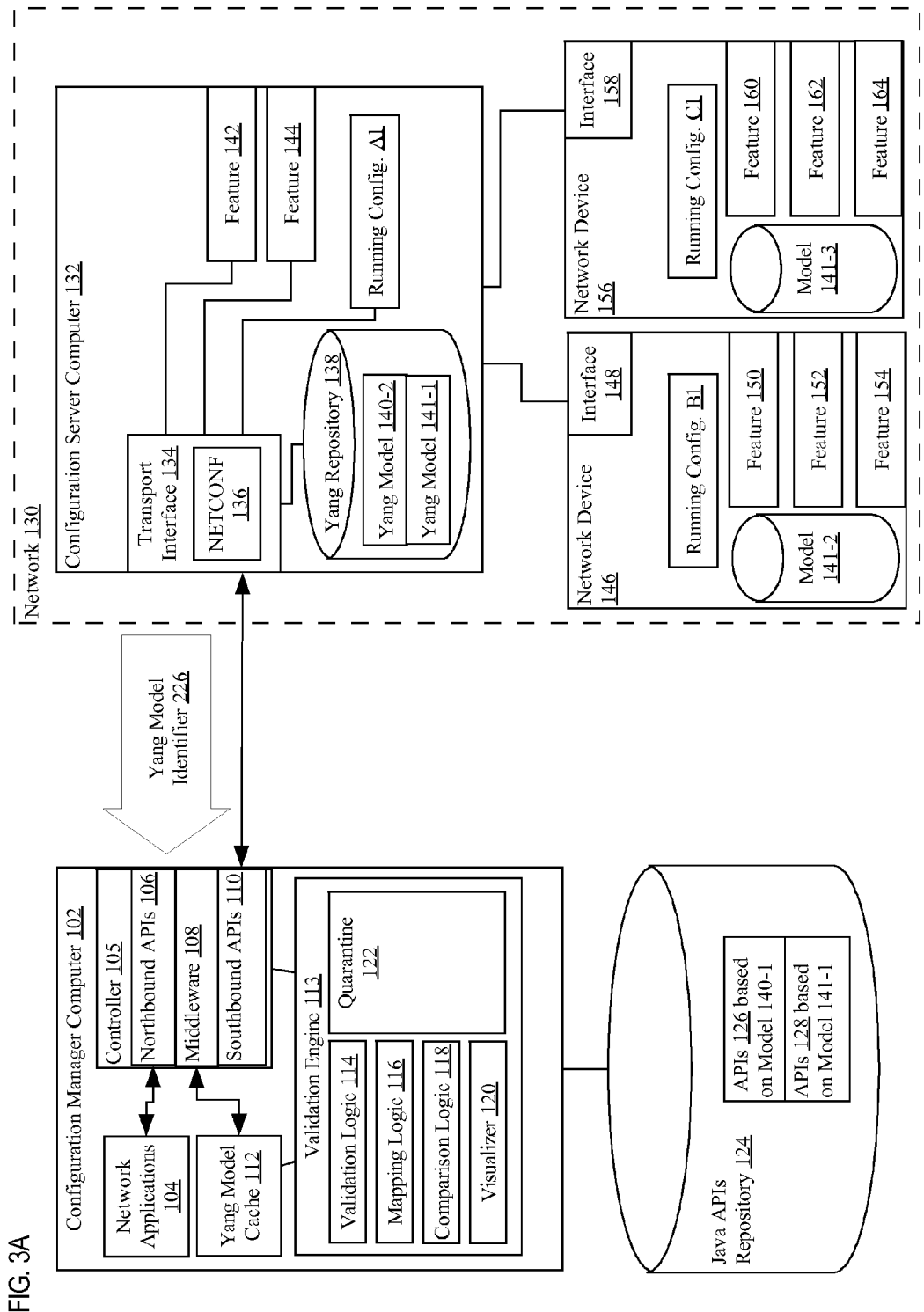
FIG. 3A is a block diagram illustrating a configuration manager computer receiving a signature of a Yang model.

FIG. 3A is a block diagram illustrating a configuration manager computer 102 receiving a signature 226 of a Yang model 140-2. When the current version of the Yang model 140-2 was initially loaded into the configuration server computer 132, the configuration server computer 132 computed a hash-signature 226 by performing a standard cryptographic hash-algorithm on the Yang model 140-2. Assume the configuration manager computer 102 then attempts to connect to the configuration server computer 132.

Figure 3B:
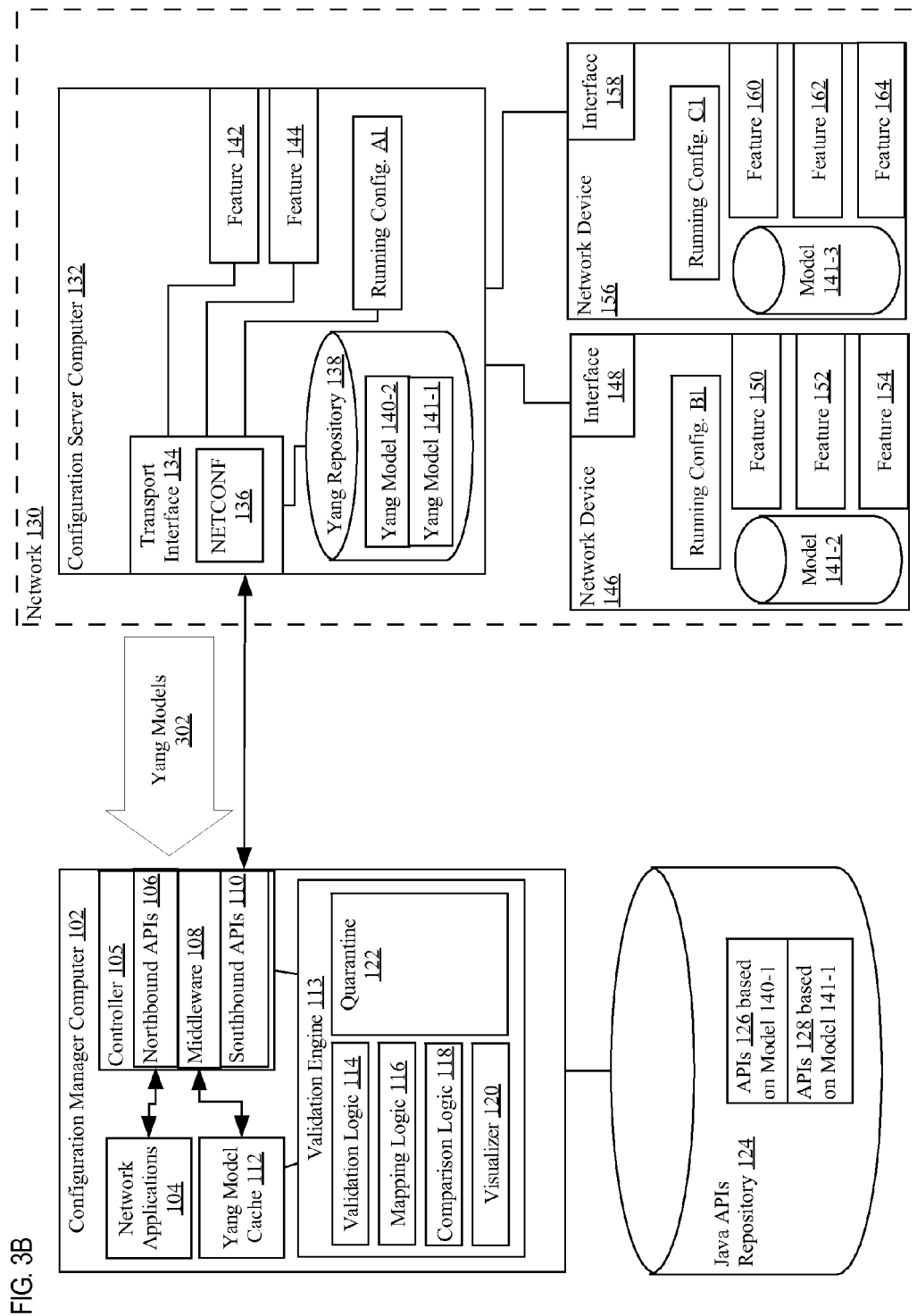
FIG. 3B is a block diagram illustrating a configuration manager computer receiving a Yang model.

The configuration server computer 132 sends a copy of the hash signature 226 to the configuration manager computer 102. The configuration server computer determines that the hash-signature does not currently reside in the Yang model cache 112, so the configuration manager computer 102 sends a request for the entire model 140-2. FIG. 3B is a block diagram illustrating a configuration manager computer 102 receiving an entire Yang model. In a counter example, assume Yang model 141-1 is sent from configuration server computer 132 to configuration manager computer 102. After comparing the hash signature of 141-2 to the hash signature of 141-1, the configuration manager computer 102 indicates that Yang model 141-2 does not need to be sent because Yang model 141-2 and Yang model 141-1 are the same model version with the same hash signature.

Loading a Yang Model and then Generating a Signature

In some embodiments, the network device may not be configure to generate a signature for the current model prior to loading the current model into main memory. In such embodiments, the controller 105 receives the Yang model to be compared and then generates a signature by applying the same hash function that was applied on the basis model to generate a second signature.

FIG. 3B is a block diagram illustrating a configuration manager computer receiving a Yang model. Assume that FIG. 3A has not occurred prior to FIG. 3B. The configuration manager computer 102 attempted to connect to the configuration server computer 132, and the configuration server computer 132 sends an entire Yang model in response. The configuration manager computer 102 computes a hash-signature by performing a cryptographic hash-algorithm on the Yang model 300, and parses any other data necessary for the validation engine 113 to perform a validation analysis.

Validation Engine

A validation engine 113 compares the identifiers of the currently governing Yang models with the corresponding identifiers of the cached Yang models. If at least one Yang module name is different, then the new model is cached, and new code is generated based off of the new Yang model. If at least one revision date is different, then the new Yang model is loaded into main memory, and the code corresponding to that Yang model is automatically updated or regenerated. If the module name and revision date are the same, but the signatures are different, then the new model is quarantined, and code is not generated according to the new model without additional processing.

After loading one or more models, a validation engine 113 parses the module name and the revision date of the models loaded. These names are compared with the models located in the Yang model cache 112. If any model matches both the module name and the revision date stored in the Yang model cache 112, then that model is selected for mounting. Alternatively, the Yang model may be selected for mounting first, and then the incoming model is only compared against the basis model selected.

Figure 3C:
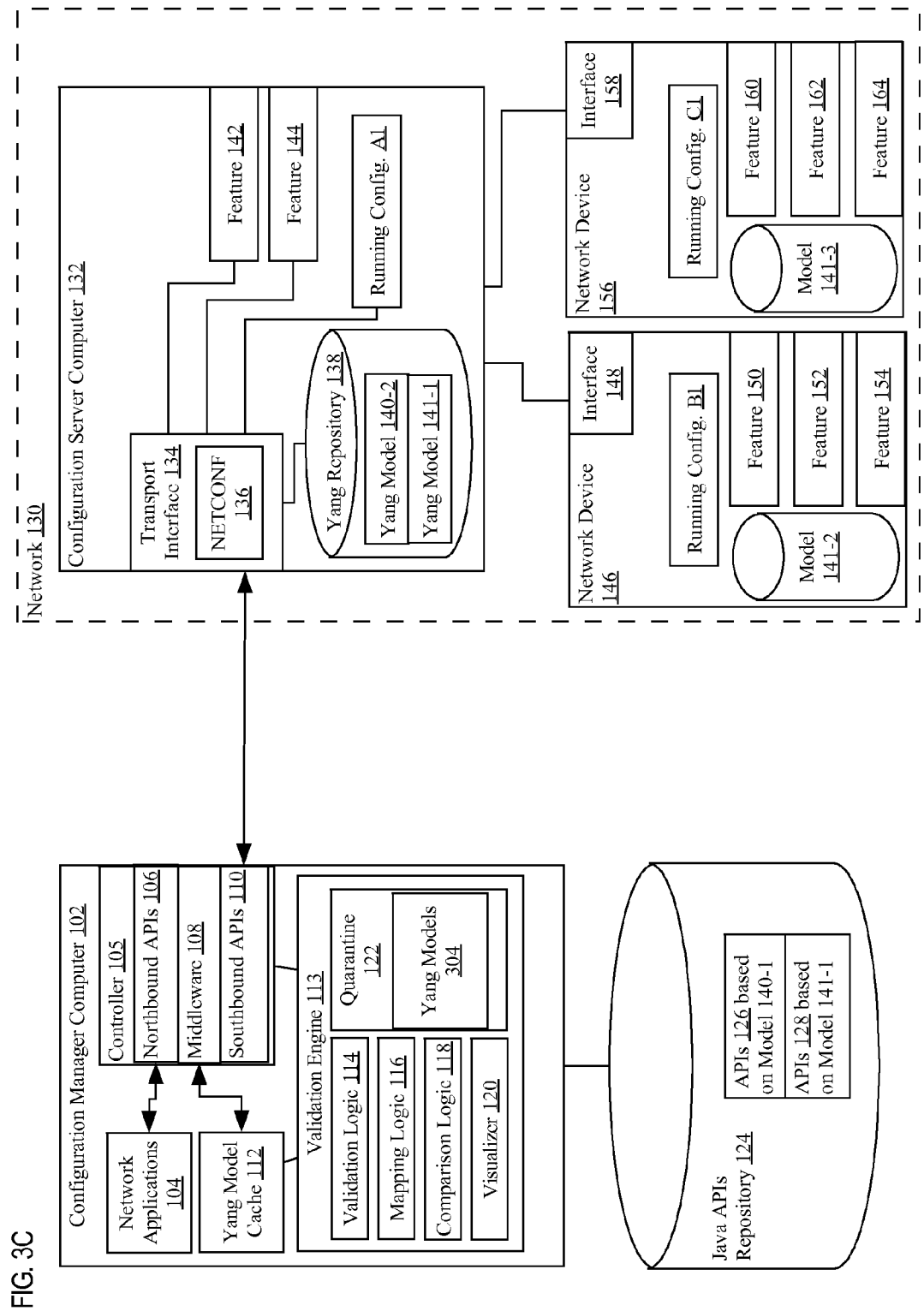
FIG. 3C is a block diagram illustrating a configuration manager computer quarantining a Yang model.

However, before the data model may be mounted, the validation engine 113 compares the signature of the incoming model with the signature of the basis model. If these signatures do not match, then the validation engine 113 sets a flag value. The model validation engine 113 then quarantines the context in which the model was loaded based on the flag value. FIG. 3C is a block diagram illustrating a configuration manager computer quarantining a Yang model.

Blocking Code Regeneration

In some embodiments, the validation engine 113 blocks the run-time code generation of loaded models with a mis-matched signature. The validation engine 113 prevents models 304 with the same version but a different computed hash signature from being loaded into the cache 112 at run-time. Thus, network devices that do not have the poorly revisioned Yang model 140-2 are not affected and can continue to be managed by code generated from the Yang model 140-1 in the Yang model cache 112. In some embodiments, the quarantine security feature may be activated or deactivated by a network administrator.

In some embodiments, the validation logic program code module 114 may set a cautionary flag, and code is blocked from being regenerated if a certain percentage of changes are in the incoming Yang model 140-2 that modify the Yang model 140-1 from the previous version without proper revision data indicating the changes. A system designer may set the threshold number of changes or percentage of changes that a Yang model may have before new code is generated. The threshold percentage or number of changes may distinguish a Yang model that was modified with minor "tweaks" and a Yang model that has been updated for malicious purposes. Each change may be given less or more weight depending on whether the change is a high-impact change or a low impact change.

Using Old Yang Model Instead of Currently Governing Model

In some embodiments, rather than using the quarantined Yang model 304 to generate code, the APIs 126 generated from the basis model 140-1 are used instead. Yang models are backward compatible, so sending configuration data using the old model 140-1 will be validated even if the network device is running a newer (if poorly versioned) Yang model 140-2. If for some reason the new configuration data cannot be committed under the new Yang model constraints, the old configuration data A1 will still run the network device.

Figure 4A:
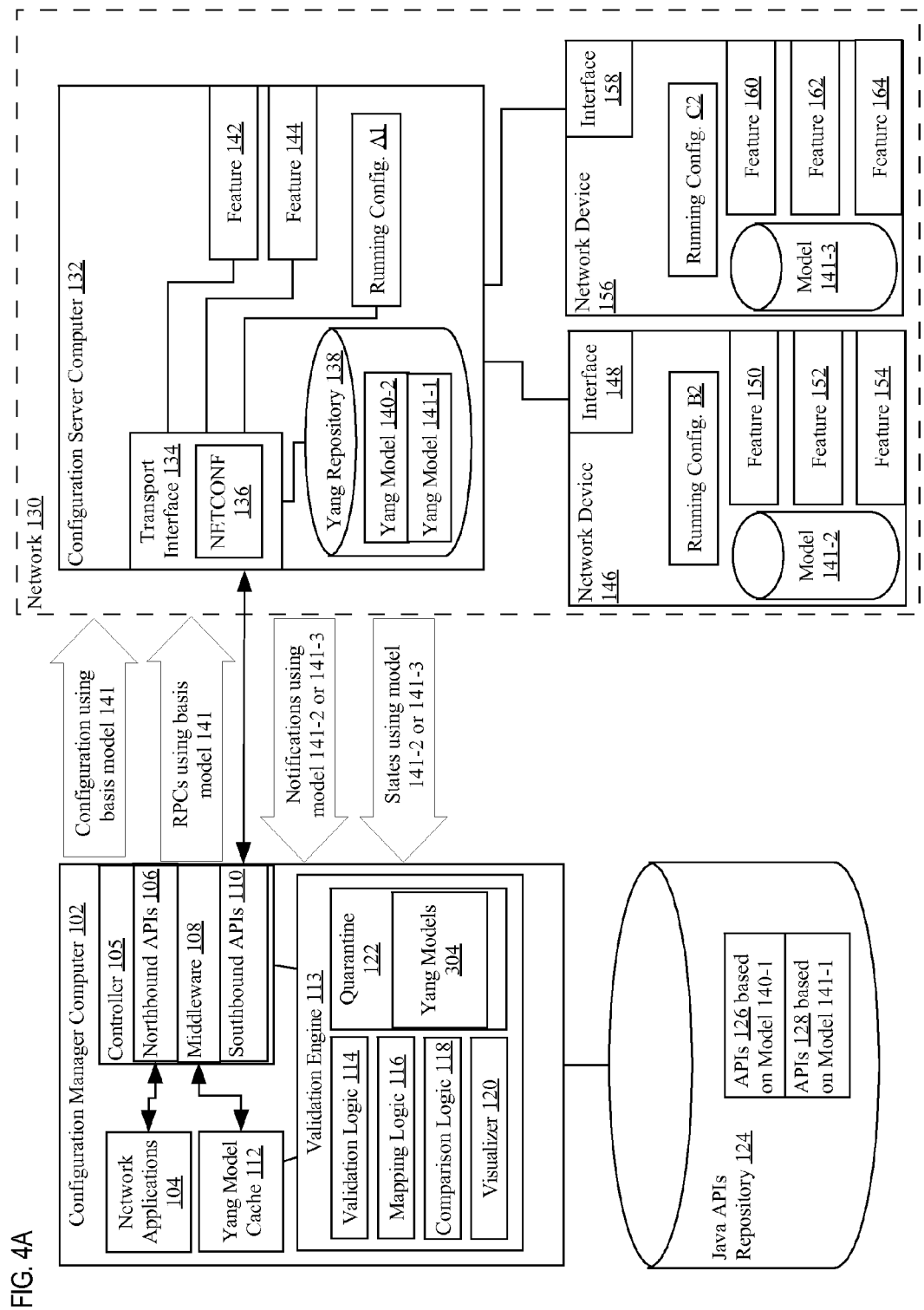
FIG. 4A is a block diagram illustrating configuration data being sent through APIs generated under the first version of the Yang model.

FIG. 4A is a block diagram illustrating configuration data being sent through APIs generated under a first version of a Yang model. The network devices 146 and 156 have different versions 141-2, 141-3 of the same Yang model. The basis Yang model 141-1 has been cached in the Yang model cache 112. Validation logic program code module 114 determines that version 141-2 is valid when compared with 141-2, but version 141-3 is invalid. After validation logic program code module 114 determines that the governing model of at least one of these devices must be quarantined in quarantine 122, the APIs 128 based on the basis model 141-1 are used to send configuration data. Rather than polluting the Yang model cache 112, configuration data is only sent according to the basis Yang model 141-1, and network device 146 and 156 may be configured using APIs 128 generated from the same basis model 141-1. Using these settings, network devices 146 and 156 are now configured to run configuration B2 and C2, respectively.

Using a Quarantined Yang Model

Figure 4B:
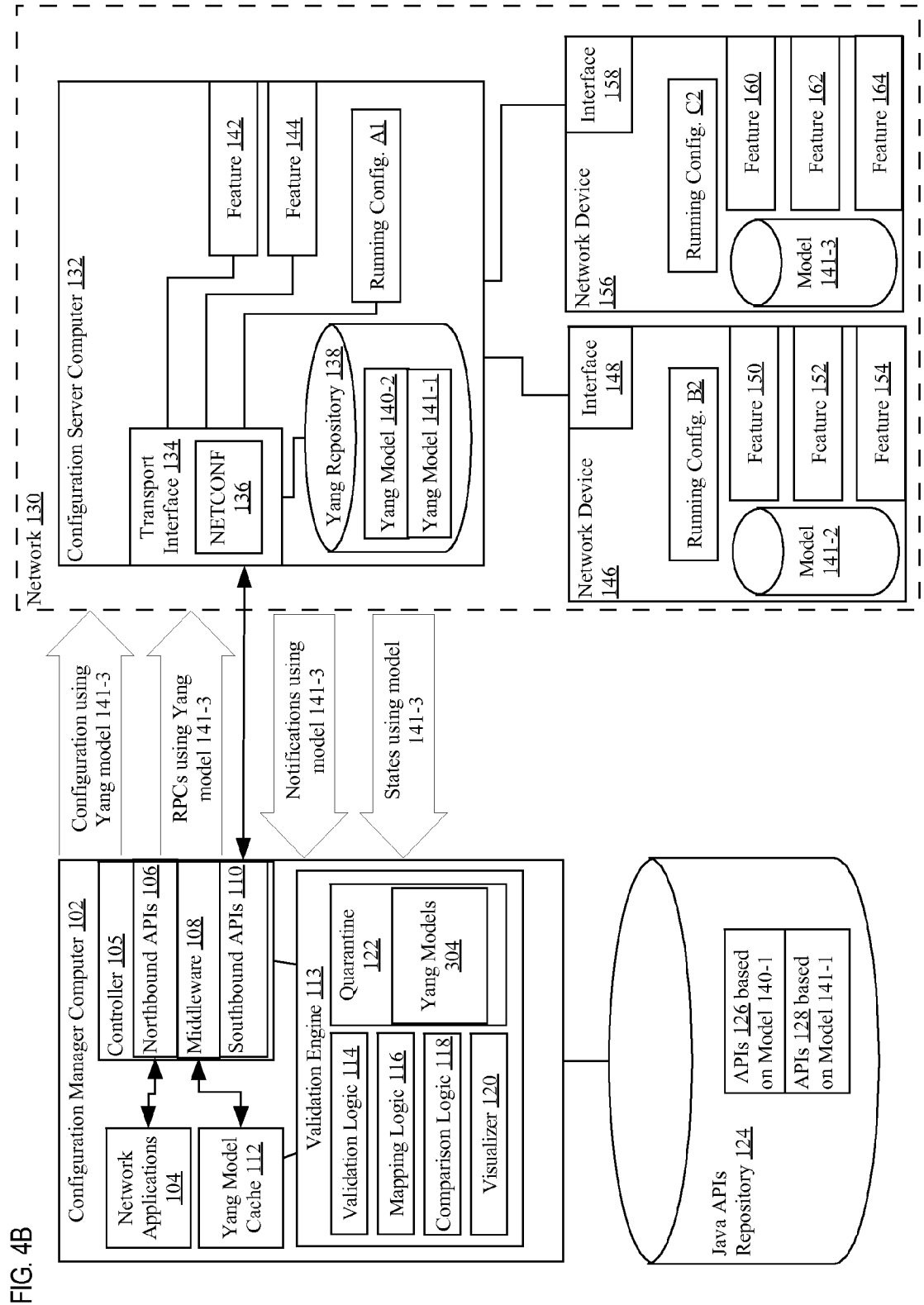
FIG. 4B is a block diagram illustrating configuration data being sent through APIs generated under the second version of the Yang model.

After an incoming Yang model is quarantined, the Yang model may be released from quarantine by an administrator. The MD-SAL generates code using the most current Yang model. In this case, a log or version control software may be used track changes between the models and changes between the new code and the old code. Network errors that occur under stress of future network traffic may be more easily identified by comparing the errors to known type definition changes that have been logged. FIG. 4B is a block diagram illustrating configuration data being sent through APIs generated under the second version of the Yang model. Assume network devices 146 and 156 have different versions 141-2, 141-3 of the same Yang model. After validation logic program code module 114 determines that the governing model 141-3 of network device 156 must be quarantined in quarantine 122, an administrator determines that the new Yang model 141-3 should be used, and the APIs are regenerated to send configuration data based on commands received from network applications 104. Even though network device 146 is currently governed by the basis Yang model of 141-2, configuration data is sent according to the newest version of the Yang model 141-3 to both devices 146 and 156. Using these settings, network devices 146 and 156 are now configured to run configuration B2 and C2, respectively.

In some embodiments, a service may issue cautionary reminders of logged type definition changes when errors cause network failure. The service may recommend regenerating new code based on a newer version of the Yang model, or the service may recommend contacting the Yang model developer for a properly "revisioned" Yang model.

Making a New Yang Model with Proper Revision Number or Flag

In some embodiments, a network operator may manually up-version the incoming version of a Yang model that has a different signature. The controller 105 may provide a command to replace the improperly versioned model with the up-versioned Yang model in the repository of a network device. The up-version may contain additional flag values in the revision field of the underlying model to indicate that the up-version was made in-network rather than by the original model developer. For example, an updated Yang model may be sent from the configuration manager computer 102 through the configuration server computer 132 to the network device 156.

Figure 4C:
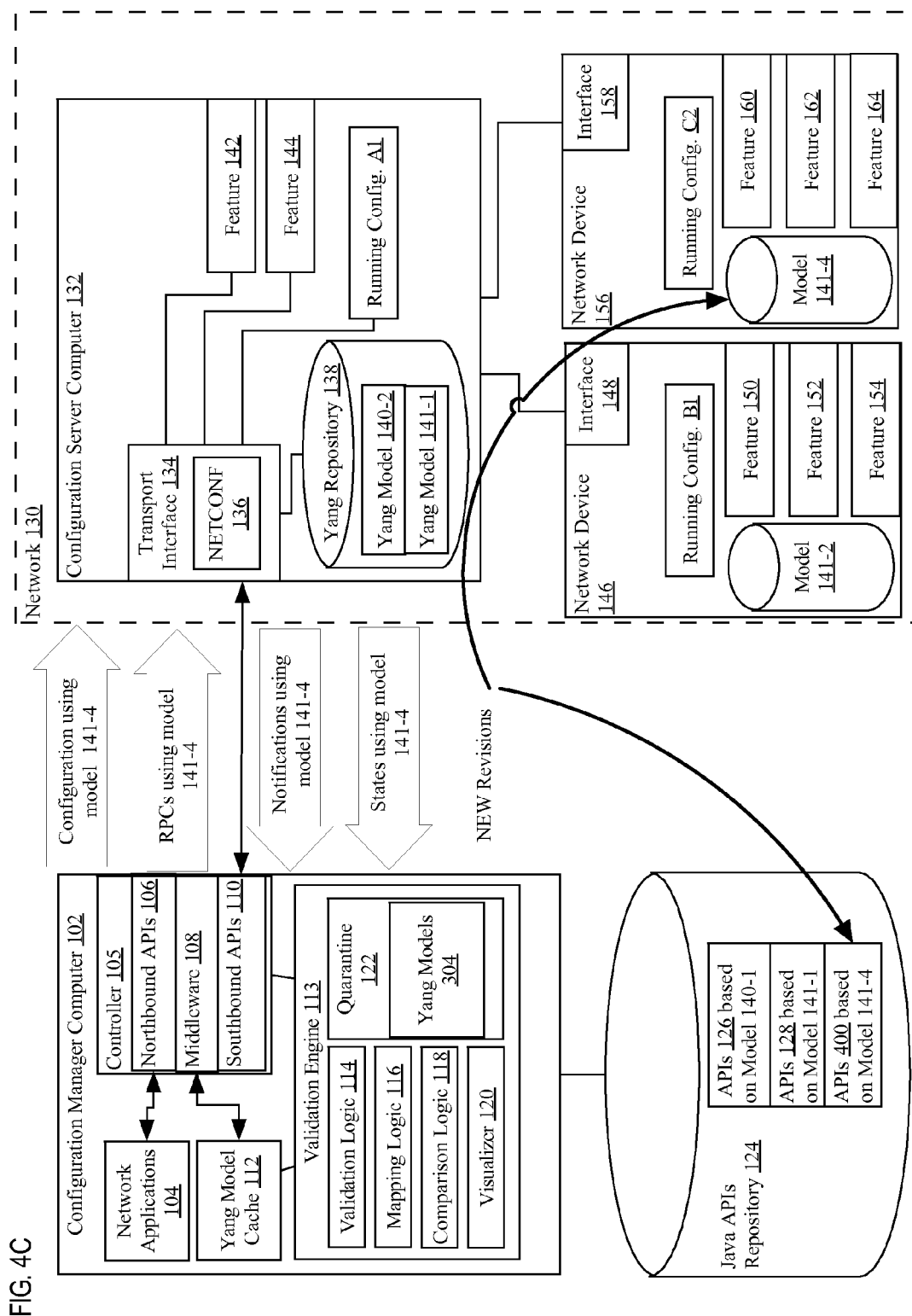
FIG. 4C is a block diagram illustrating a new Yang model being generated and configuration data being sent through APIs under the new Yang model.

FIG. 4C is a block diagram illustrating a new Yang model being generated and configuration data being sent through APIs under the new Yang model. After validation logic program code module 114 determines that the governing model 141-3 of device 156 must be quarantined in quarantine 122, an administrator determines that the new Yang model 141-3 should be updated to model 141-4. The APIs for the new Yang model 141-4 are regenerated to send configuration data based on commands received from network applications 104. A new NETCONF protocol session is established for configuring network device 156. The updated Yang model 141-4 for network device 156 is sent from configuration manager computer 102 to network device 156 through configuration server computer 132. Configuration data for network device 156 is managed in network applications 104 and sent based on APIs generated from the new model 141-4. Using these settings, network device 156 is now configured to run configuration C2.

The validation engine 113 may also be configured to automatically generate a new revision of an old Yang model that has not been revisioned properly. All of the newly generated code may be automatically tested with additional validation mechanisms, such as being tested in a security sandboxed virtual network before being deployed.

Data Models Outside of Yang Models

Data models described herein primarily focus on Yang models. The same techniques may be applied to YIN models, which is a data model language that uses an XML format instead of the bracket format shown in FIGS. 2A and 2B. Configurations may also be accessible and configured through older standards such as transferring files known as SMIs through a simple network messaging protocol (SNMP) to model MIB files.

Developers can model configuration and state data for an entire network using a combination of SMI (SNMP MIBs), YANG, or YIN. Requesting each specific model may require using a specific protocol (NETCONF or SNMP in these cases) to retrieve and configure any network device features.

In some embodiments, the techniques described herein may include an additional step of translating each data model into a Yang model. For example, YANG maintains compatibility with Simple Network Management Protocol's (SNMP's) SMIv2 (Structure of Management Information version 2. SMIv2-based MIB modules can be automatically translated into Yang modules, and the techniques described herein may be applied.

Visualization Engine

The network management computer 102 creates and stores digital data content of a first set of fields from the basis data model. A mapping logic program code module 116 then creates and stores a field mapping that maps the first set of fields to a second set of fields from the quarantined data model. With the field mapping of the first set of fields to the second set of fields, comparison logic program code module 118 is configured to compare content from first set of fields with content from the second set of fields, and identify at least one difference in content of the second set of fields from the first set of fields. A visualizer 120 then generates a difference indication that specifies at least one difference that caused the signature of the currently governing model to be different from the signature of the cached basis model.

Difference indications may be visual or audio including, but not limited to, text, comments, overlays, highlights, graphics, or any combination thereof. The differences may be emphasized with colors such as green, yellow, and red based on the level of threat that a particular change may cause to the network. For example, a green difference indication may signify a low threat difference. A low threat difference may be a change in the description of a container or leaf. A yellow difference indication may signify a medium level threat difference such as a change that is backwards compatible with the old basis model. A red difference indication may signify a high level threat difference, such as a change in the name of a container or leaf, or the change in a type definition that is not backwards compatible.

The difference indication may be a tiered warning level based on the potential impact of the detected difference. For example, a difference in models for strings or comments fields may be indicated with a "low tiered warning level" difference indication, while differences in data-type declarations may be marked as "high tier warning level" difference indications. The difference indication may also include a different type of indication for different node types. For example containers may change name and description without necessarily changing the underlying leaf type definitions grouped by the container. These changes may be indicated with an error that requires an "up-versioning", while other changes may only be indicated with a warning.

The server computer may visualize the second Yang model with warnings in a columnar format. FIG. 5 is a block diagram illustrating a visualization of a second version a Yang model that has been compared with the first version of the Yang model. The second version of the Yang model has hierarchal folders with columns for node, node-type, type-definition, description, and warnings. The warning column displays the difference indication. Alternatively, the entire row that represents a leaf or container may be highlighted in a color representing the impact of the difference as a difference indication. In still other embodiments, the server computer may cause to be displayed on a client computer a dependency graph visualization with comments or colors representing the impact of the difference between the incoming model and the basis model.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
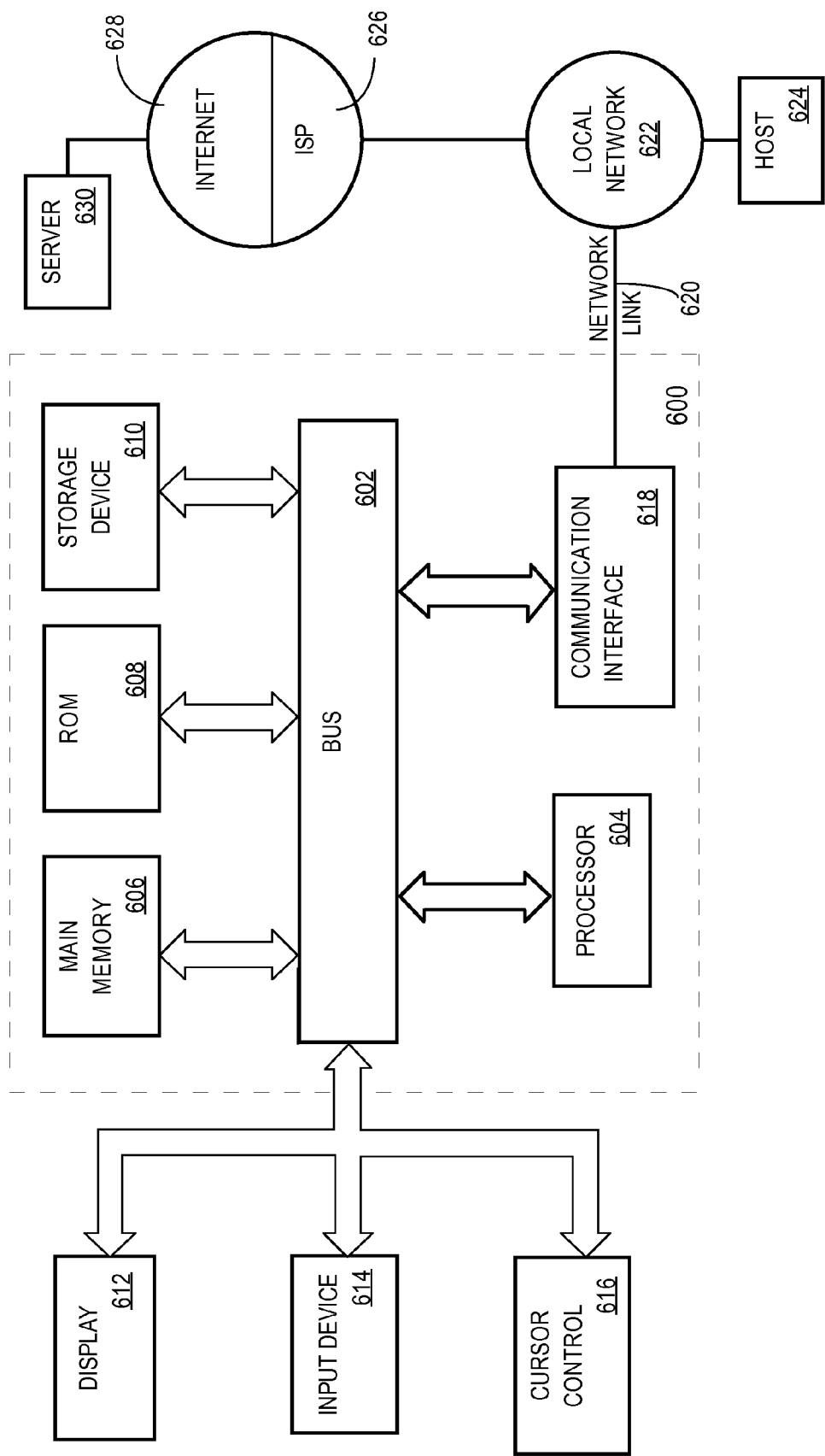
FIG. 6 is a block diagram illustrating a computer system that may be used to implement the techniques described herein.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   using a server computer, creating and storing a first module name, a first indication of a first version, and a first signature for a first data model that is digitally stored in a digital electronic data storage unit;
   using the server computer, receiving a second data model from the data storage unit and identifying a second module name in the second data model;

using the server computer, comparing the second module name of the second data model to the first module name of the first data model;
determining that the first module name and the second module name comprise a same name, and in response thereto, identifying a second indication of a second version from a revision field of the second data model;
using the server computer, comparing the second indication of the second version from the second data model to the first indication of the first version of the first data model;
determining the first indication and the second indication indicate the same version, determining a second signature for the second data model;
using the server computer, comparing the second signature for the second data model with the first signature for the first data model;
determining from the comparison that the second signature and the first signature are different, and in response thereto, creating and storing a flag value in main memory of the server computer and specifying that the second data model is different;
creating and storing digital data content including a first set of fields from the first data model;
creating and storing a field mapping that maps the first set of fields to a second set of fields from the second data model;
comparing content from first set of fields with content from the second set of fields and identifying at least one difference in content of the second set of fields from the first set of fields; and
causing displaying, on a client computer, a difference indication that specifies the at least one difference.

2. The method of claim 1, further comprising, using the server computer, preventing loading at run-time the second data model having the same version but a different signature.

3. The method of claim 1, wherein the first data model and the second data model are Yang computer program code modules.

4. The method of claim 3, further comprising determining the second signature by evaluating a hash algorithm, using the server computer, against one or more Yang models containing the second data model.

5. The method of claim 1, further comprising:
using the server computer, receiving the second signature prior to loading the second data model;
determining that the second signature and the first signature are different, and in response thereto, loading the second data model into main memory of the server computer.

6. The method of claim 1, wherein the difference indication comprises a tiered warning level of the at least one difference.

7. The method of claim 6, wherein the difference indication comprises a low tier warning level for changes in comments and a high tier warning level for changes in data-type declarations.

8. The method of claim 1, wherein the difference indication includes a different type of warning for different leaf types.

9. The method of claim 8, wherein the different leaf types include a group consisting of remote procedure call leafs, notification leafs, state leafs, and configuration leafs.

10. One or more non-transitory storage media storing instructions which, when executed by one or more computing devices, cause performance of a method comprising the steps of:
using a server computer, creating and storing a first module name, a first indication of a first version, and a first signature for a first data model that is digitally stored in a digital electronic data storage unit;
using the server computer, receiving a second data model from the data storage unit and identifying a second module name in the second data model;
using the server computer, comparing the second module name of the second data model to the first module name of the first data model;
determining that the first module name and the second module name comprise a same name, and in response thereto, identifying a second indication of a second version from a revision field of the second data model;
using the server computer, comparing the second indication of the second version from the second data model to the first indication of the first version of the first data model;
determining the first indication and the second indication indicate the same version, determining a second signature for the second data model;
using the server computer, comparing the second signature for the second data model with the first signature for the first data model;
determining from the comparison that the second signature and the first signature are different, and in response thereto, creating and storing a flag value in main memory of the server computer and specifying that the second data model is different;
creating and storing digital data content including a first set of fields from the first data model;
creating and storing a field mapping that maps the first set of fields to a second set of fields from the second data model;
comparing content from first set of fields with content from the second set of fields and identifying at least one difference in content of the second set of fields from the first set of fields; and
causing displaying, on a client computer, a difference indication that specifies the at least one difference.

11. The one or more non-transitory storage media of claim 10, containing instructions when executed by one or more computing devices, further causing the performance of preventing loading at run-time, using the server computer, the second data model having the same version but a different signature.

12. The one or more non-transitory storage media of claim 10, containing instructions when executed by one or more computing devices, further causing the performance of determining the second signature by evaluating a hash algorithm, using the server computer, against one or more Yang computer program code modules containing the second data model.

13. The one or more non-transitory storage media of claim 10, containing instructions when executed by one or more computing devices, further causing the performance of:
using the server computer, receiving the second signature prior to loading the second data model;
determining that the second signature and the first signature are different, and in response thereto, loading the second data model into main memory of the server computer.

14. The one or more non-transitory storage media of claim 10, wherein the difference indication comprises a tiered warning level of the at least one difference.

15. A computing device comprising one or more computing processors with one or more accessible memories, the accessible memories comprising:
- a data model cache with a first module name, a first indication of a first version, and a first signature for a first data model;
- the one or more computing processors configured to:
- compare a second data model with the first data model by comparing a second module name with the first module name, a second indication of a second version with the first indication of the first version, and a second signature and the first signature; and
- create and store digital data content including a first set of fields from the first data model;
- create and store a field mapping that maps the first set of fields to a second set of fields from the second data model;
- compare content from first set of fields with content from the second set of fields and identifying at least one difference in content of the second set of fields from the first set of fields; and
- cause displaying, on a client computer, a difference indication that specifies the at least one difference; and
- a quarantine for the second data model where:
  - the second module name and the first module name are the same,
  - the second indication and the first indication are the same, and
  - the second signature and the first signature are different.

16. The computing device of claim 15, wherein the computing device further comprises:
- mapping logic that maps a first set of fields from the first data model to a second set of fields from the second data model;
- comparison logic that compares content from first set of fields to content from the second set of fields to identify at least one difference in content of the second set of fields from the first set of fields; and
- a visualizer that generates an indication of the at least one difference.

17. The computing device of claim 16, wherein the visualizer generates the indication with a tiered warning level of the at least one difference.

18. The computing device of claim 17, wherein the visualizer generates indications of low tier warnings for changes in comments and a high tier warnings for changes in data-type declarations.

* * * * *